Aug. 25, 1964    M. N. PAPADOPOULOS ETAL    3,146,190
RECOVERY OF AROMATICS
Filed May 8, 1961
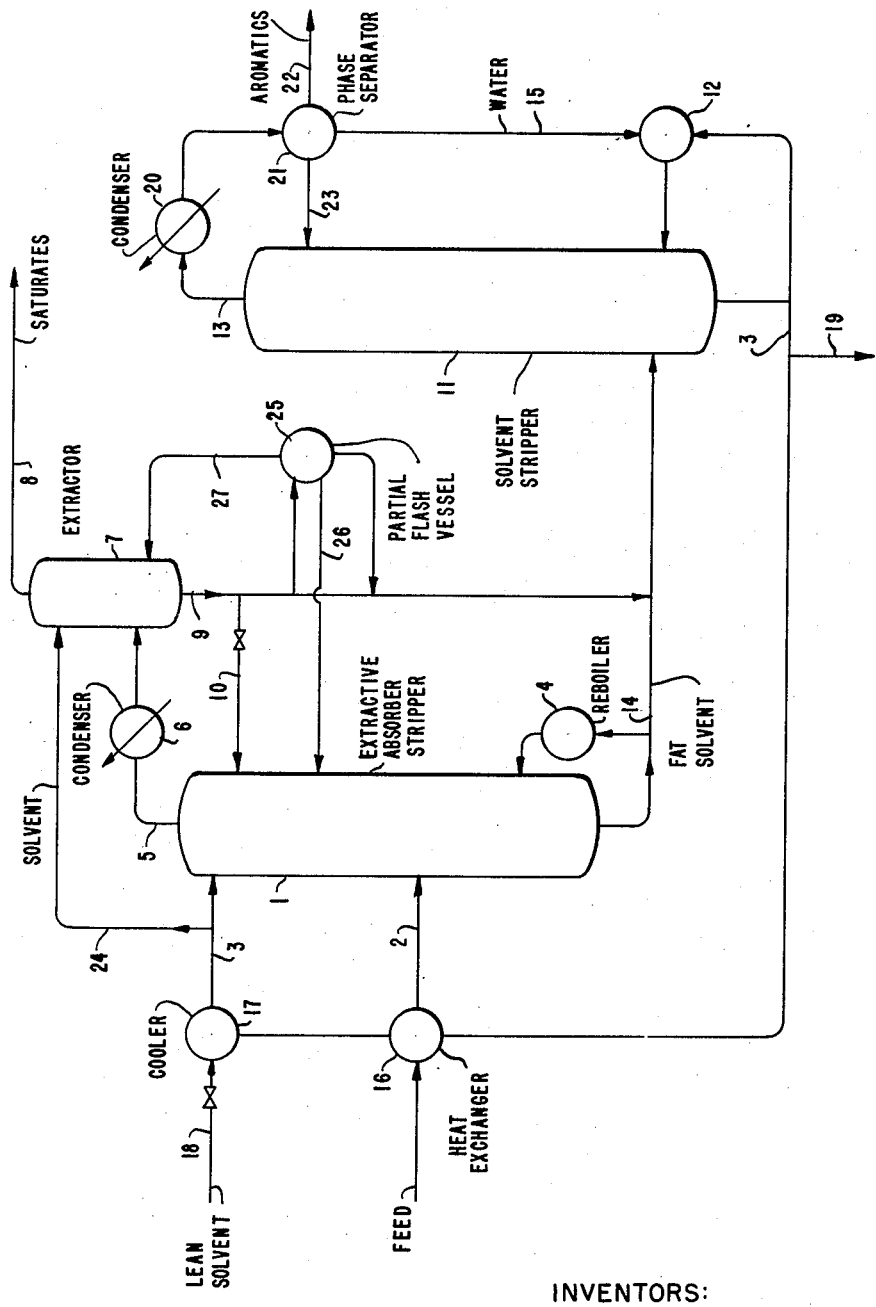
INVENTORS:
MICHAEL N. PAPADOPOULOS
CARL H. DEAL
ELDRED E. YOUNG
BY: *Robert C. Clement*
THEIR ATTORNEY

United States Patent Office 3,146,190
Patented Aug. 25, 1964

3,146,190
RECOVERY OF AROMATICS
Michael N. Papadopoulos, Walnut Creek, Carl H. Deal, Orinda, and Eldred E. Young, Concord, Calif., assignors to Shell Oil Company, New York, N.Y., a corporation of Delaware
Filed May 8, 1961, Ser. No. 108,630
4 Claims. (Cl. 208—313)

This invention relates to a new and improved process for recovering the aromatic components from aromatic containing feed stocks and is particularly adapted to hydrocarbon mixtures containing large concentrations of aromatics. More specifically, this invention is directed to an improved absorption, stripping, extraction process for the recovery of aromatics whereby highly selective solvents are employed and phase separation in the absorption step is avoided thereby enhancing process selectivity.

A conventional process employed for the recovery of high purity aromatics from various feed stocks is extractive distillation. In an extractive distillation process a selective solvent of high solvency is caused to flow countercurrently down a distillation column as the distillation proceeds and as the vapors ascend from a reboiler. In such an extractive distillation process the solvent serves to scrub the vapors in the upper portion of the column selectively dissolving the more soluble component, i.e., aromatics. The volatility of the less soluble component, i.e., saturates, is increased over that of the more soluble component, aromatics. The resulting fat solvent is partially stripped in the lower portion of the column by feed vapors ascending from the distillation reboiler. To reduce solvent loss overhead and to prevent aromatics from passing overhead, the raffinate is refluxed, that is a portion of the raffinate is condensed and recycled into the rectifying section of the column thereby increasing the concentration of saturates in that section and reducing the amount of aromatics taken overhead in the vapor stream. Without refluxing it is possible to recover a solvent extract phase of high purity, i.e., about 99+% aromatics. However, this is only accomplished by sacrificing the amount of aromatics recovered.

Refluxing while enhancing the amount of aromatics recovered, does have adverse effects such as: (1) increasing the amount of saturated material in the solvent extract phase withdrawn from the tower; (2) requiring a highly soluble solvent under all tray conditions, thereby necessitating either a less selective solvent or a very large solvent circulation; (3) reducing the relative volatility (low solvent selectivity) requiring large process heat loads; (4) requiring a more complete removal of components boiling appreciably above the desired aromatics, that is further prefractionation is required to insure a sharp separation in the extractive distillation; and (5) increasing the liquid loading of the tower thus requiring a larger vessel in addition to increasing the heat load to the tower.

It is an object of this invention to provide an improved process for the separation of mixtures of aromatics from non-aromatics efficiently and effectively by an improved absorption, stripping, extraction process. It is a further object of this invention to provide an improved absorption, stripping, extraction process wherein no phase separation occurs in the absorption section. It is another object of the invention to provide an improved absorption, stripping, extraction process utilizing a sulfolane solvent for a high recovery of pure aromatics. It is a further object of this invention to provide a process for the recovery of substantially all of the aromatic components of a hydrocarbon mixture in highly purified form. A further object of the invention is to provide an improved process for the recovery of aromatics of varying carbon number spreads in high purity at one time from a mixture containing aromatics and non-aromatics. Other objects and advantages of this invention will become apparent in the description thereof which is made with reference to the accompanying drawing which consists of a single figure and is a schematic diagram of a preferred embodiment of the process.

Accordingly, the invention is directed to a process for recovering one or more aromatic components of a mixed hydrocarbon feed stock by charging the latter into the upper section of an extractive absorber-stripper column in which absorption of aromatics occurs by virtue of the selectivity of a relatively non-volatile sulfolane solvent introduced therein, that is the sulfolane solvent tends to depress the boiling point of the aromatic components present in the feed stock by dissolving these components into the solvent composition. The non-aromatic constituents whose boiling points are substantially lowered by the presence of this selective solvent in this section of the column are released through a vapor outlet at the top of the column along with a fraction usually containing at least a small portion of the more volatile aromatic components of the feed stock and some solvent. In the present process the unique solubility and selectivity properties of sulfolane are used without the formation of two liquid phases.

Ordinarily when a solvent selective for aromatics is used for the purpose of isolating aromatics at high recovery (about 99%) and high purity (about 99%) the feed is first extracted with the solvent and then some device such as a countersolvent, temperature induced back wash, flashed back wash, or extractively stripped back wash is used to improve the aromatic purity obtained by the simple extraction step. In accordance with the present invention, the liquid feed is first contacted with a sulfolane solvent in an absorber stripper column wherein the aromatics are removed as bottoms at high purity (about 99%) but only at moderately high recovery (about 80 to 90%). The remaining aromatics usually only about 10% or less of the amount originally present escape as vapor overhead with the saturate raffinate (without refluxing). This small hydrocarbon raffinate stream is contacted, after condensing, with solvent in an extractor wherein the majority of the aromatics are removed by a selective solvent. The present invention results in considerable improvement in process performance and in reduction of process cost. For example, (1) the extractor is much smaller than would be in the ordinary case where the feed is first extracted with solvent (note in the present invention the amount of aromatics to be extracted is a tenth or les of those contained in the original feed), (2) extraction is much simpler than would be in the conventional extraction process proces since only a moderate recovery and only moderate purity of aromatics from the raffinate stream is required. The fat solvents from the absorber-stripper column and the extractor are stripped of aromatics in a separate solvent stripper. In the improved process of the present invention there is no refluxing of the raffinate absorber-stripper column, thereby decreasing the concentration of non-aromatic hydrocarbons ordinarily present with refluxing, which in turn allows the use of more selective solvents such as the sulfolane solvents.

In the absorption, stripping, extraction process of the invention the conditions of temperature, pressure and concentration in the extractive absorber-stripper can be selected so that no phase separation occurs. A lean sulfolane solvent is introduced at the top tray of the extractive absorber-stripper column. The liquid feed is introduced at a central or midway point in the column. The solvent flows down the column countercurrent to the ascending feed vapor. The section of the column between the lean solvent inlet and the liquid feed inlet serves as an absorber section wherein the solvent scrubs the vapors selectively absorbing the more soluble component (aromatics). The fat liquid solvent then passes down into the "stripper section" of the column, i.e., that portion of the column below the feed entry wherein any raffinates absorbed in the solvent are stripped and the more volatile aromatics are also stripped from the descending fat solvent by a reboiler. The fat solvent is continuously withdrawn from the extractive absorber-stripper and introduced into a solvent stripper along with fat solvent from the extractor. After stripping, the lean solvent is recycled to the uppermost tray of the extractive absorber-stripper column. The high purity, high yield, aromatics are taken overhead as products from the solvent stripper. Steam is introduced into the solvent stripper, by means of a reboiler, to govern the recovery of the aromatic hydrocarbons in the overhead and the hydrocarbon content of the recycling lean solvent. Reflux is used to knockback the sulfolane solvent in the overhead stream of the solvent stripper. The vaporous non-aromatics containing some solvent and aromatics pass overhead from the absorber-stripper column as a raffinate phase. The raffinate is condensed and passed into a liquid-liquid extractor (preferably a rotating disc contactor (RDC)) where it is contacted with a portion of the lean solvent to provide a high purity raffinate product containing very little aromatics. The fat solvent from the extractor is then combined with the fat solvent from the extractive absorber-stripper and passed to the solvent stripper. In alternative processes the fat solvent stream from the liquid-liquid extractor may be returned to the absorber-stripper tower at a point below the lean solvent inlet and above the feed inlet to remove small amounts of low boiling saturates which might be contained therein, or passed through a partial flash vessel with the flashed saturates introduced into the extractor below the feed inlet as backwash or introduced into the extractive absorber-stripper column above the feed inlet. These alternative methods can be employed to insure that the saturates extracted from the extractor column are not introduced into the solvent stripper.

The sufolane solvent which can be used according to this invention should preferably be selective to aromatics. Further, the solvent must be stable at the extractive absorber-stripper column temperatures and at the stripping temperatures maintained in the solvent stripper column. That is the solvent must be sufficiently heat stable so that it may at least partially vaporize without decomposition in the presence of the components of the mixture. In a preferred embodiment the sulfolane solvent has a boiling temperature higher than that of the aromatic components of the mixture to be selectively absorbed.

The sulfolane solvents of the invention may be made by condensing a conjugated diolefin with sulfur dioxide and then subjecting the resulting product to hydrogenation, alkylation, hydration and/or other substitution or addition reactions. A 2-sulfolene may be made similarly by isomerizing instead of hydrogenating the product resulting from condensing the conjugated diolefin with sulfur dioxide. Unsubstituted sulfolane has the formula

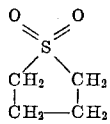

and 2-sufolene has the formula

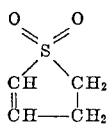

Other solvents which have high selectivity for separating aromatics from non-aromatic hydrocarbons are 2-methylsulfolane, 2,4-dimethylsulfolane, 2,4-dimethyl-4-sulfolane, methyl 3-sulfonyl ether, ethyl 3-sulfonyl sulfide, methyl-aryl-3-sulfonyl ether, n-aryl-3-sulfonyl amine, 3-sulfonyl acetate and others. Although the use of sulfolane solvent is a preferred embodiment of the invention, other suitable solvents such as diethylene glycol, various polyethylene glycols, and mixtures thereof can be employed. In a preferred embodiment of the invention, the sulfolane solvents for use in the extractive absorber-stripping process have the general formula:

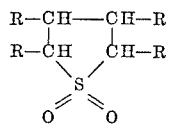

where R can be a hydrogen atom, an alkyl group having up to 10 carbon atoms, an alkoxy radical having up to 8 carbon atoms, an arylalkyl radical having up to 12 carbon atoms or mixtures thereof. In a particularly preferred embodiment, all R's are hydrogen.

Many different aromatic/non-aromatic mixtures may be separated by the extractive absorber-stripper process of the present invention. However, a preferred embodiment of the invention is the recovery of aromatics and hydrocarbon feed mixtures containing from about 75% to about 95% by weight aromatics. The feed mixtures are at least partially vaporized at a temperature substantially below the boiling temperatures of various sulfolane solvents and are inert towards these solvents. Moreover, the presence of sulfolane solvents of the mixture causes a greater change in the "escaping tendency" of one component of the mixture relative to that of the other component. By escaping tendency is meant the potential of one component to pass from the liquid to the vapor phase. Although the process is particularly effective for the separation of mono-cyclic aromatic hydrocarbons from paraffinic hydrocarbons mixed therewith, under modified process conditions the process can be operated effectively for the recovery of polycyclic aromatic hydrocarbons such as naphthalene, alkyl naphthalenes, anthracene and other aromatic hydrocarbons which may be mixed with naphthenes, olefinic hydrocarbons and cycloolefins. The process may be applied with particular advantage to the separation of constant boiling hydrocarbon mixtures which normally are difficult to separate by simple distillation means; for example, constant boiling mixtures including fractions of petroleum conversion products containing $C_6$, $C_7$ and $C_8$ aromatic paraffinic and olefinic hydrocarbons when the object is to recover benzenes, toluene and/or xylene therefrom. A preferred source of such hydrocarbon mixtures is an appropriately boiling fraction of a thermally or catalytically reformed petroleum product. It is preferred that any olefinic components initially present in the raw feed be hydrogenated to their saturated analogs prior to treatment herein, since the resolution between aromatic and saturated hydrocarbons of both the aliphatic and alicyclic types is more readily and effectively accomplished with the majority of the sulfolane solvents of the present invention than between aromatic and olefinic hydrocarbon types.

The apparatus employed in this process may be any conventional or convenient type known to those skilled in the art. For simplicity the drawing does not show all the pumps, tanks, heat exchangers, valves, bypasses, vents, reboilers, condensers, coolers and other auxiliaries that may be necessary for the proper operation of the process but the inclusion of which will be evident to those skilled in the art.

The temperature for the extractive absorber-stripper column may range within wide limits provided it is at the bubble temperature of the mixture and substantially below the boiling temperature of the solvent under the pressure and temperature conditions maintained in the column. Subatmospheric pressures may be resorted to in order to reduce the temperature if the mixture is not thermally stable at high temperature. Suitable temperatures for the process range from about the melting point of the solvent up to above the boiling point at pressures from 0.1 p.s.i. absolute to about 500 p.s.i. absolute assuming the particular sulfolane solvent is stable under these conditions. The most suitable operating temperatures vary with the pressure maintained during the operation and are generally a compromise since in general the selectivity of these solvents seems to decrease with an increase in temperature. In a preferred embodiment of the invention substantially atmospheric pressures are maintained in the extractive absorber-stripper column.

The amount of solvent should be at least sufficient to dissolve the constituent to be extracted. In some cases a considerable excess over this amount may be used, especially when it is desired to scrub the last traces of the more soluble constituents from the vapor. The most economic amount varies with the nature of the particular sulfolane solvent involved and the temperatures and pressures employed in the particular feed mixture. This amount can be determined experimentally. Useful solvent to feed ratios in the extractive absorber-stripper column may range from about 1½ to about 20:1 by volume and preferably not more than about 5:1 by volume.

The aromatic selectivity of the sulfolane solvents can be further enhanced by the addition of water to the solvent. That is, the present solvents preferably contain a relatively small proportion of water dissolved therein to increase the selectivity of the solvent composition without reducing substantially solvency for the aromatic hydrocarbon component of the feed stock mixture. The presence of water in the solvent composition furthermore provides a relatively volatile material therein which may be distilled from the fat solvent in the solvent stripping zone to vaporize the last traces of aromatic hydrocarbon from the fat solvent stream by steam distillation. The solvent composition may contain from about 1% to about 20% by weight of a diluent such as water and preferably from about 5% to about 15% depending upon the particular sulfolane solvent utilized and the process conditions at which the absorption and the stripping sections of the column are operated.

Referring to the drawing, the high aromatic feed mixture to be separated is introduced into the extractor absorber stripper column 1 through line 2, at a point about midway up the column. The feed countercurrently contacts a solution of a lean sulfolane solvent introduced into the column through line 3 at a temperature slightly below the bubble temperature of the feed mixture. The solvent is preferably introduced at the topmost tray of the column. Extractive absorber-stripper column 1 contains several trays, such as the valve trays, grid trays, and the like, to improve vapor/liquid contacting. In addition to reboiler 4, column 1 is equipped with vapor line 5 and extract line 14. That portion of the column between the lean solvent entry at line 3 and the liquid feed entry at line 2 serves as an absorber section wherein vapors rising up the column are countercurrently scrubbed with liquid sulfolane solvent and the aromatics are absorbed. The remainder of the vapor comprising a major portion of non-aromatic hydrocarbons and some aromatic hydrocarbons and sulfolane solvent passes overhead through line 5 into condenser 6 and enters near the bottom of liquid-liquid extracting column 7. In a preferred embodiment, column 7 is fitted with a rotating disc contactor (RDC) to insure a more effective extraction of the aromatics contained in the raffinate. A high purity high yield saturate passes out of column 7 through line 8. Lean solvent is introduced into extractor column 7 via line 24. The fat solvent from extractor 7 containing aromatics, sulfolane solvent and trace amounts of light saturates is withdrawn via line 9 and can be combined with the fat solvent withdrawn from extractive absorber-stripper column 1 via line 14 or returned to extractive absorber-stripper column 1 through line 10 and introduced at a point below the lean solvent inlet and above the liquid feed inlet, or alternatively the fat solvent can be passed through partial flash vessel 25 with the flashed saturates reintroduced to extractor column 7 as back wash through line 27 or introduced into column 1 at a point above the feed entry.

The extract phase (i.e., fat solvent) comprising a sulfolane solvent and the selectively absorbed component of the feed mixture (aromatics) is withdrawn from column 1 through bottom line 14. A portion of the withdrawn extract phase is recycled to the column through reboiler 4. The remaining fat solvent is introduced into solvent stripper 11 to remove the extracted aromatics from the sulfolane solvent. Stripper 11 is provided with reboiler 12 and with vapor line 13. Water is introduced into reboiler 12 via line 15. The aromatic portion of the fat solvent is taken overhead through line 13 into condenser 20. The condensed mixture of water and product then passes into phase separator 21 with the aromatic finished product withdrawn through line 22. The water withdrawn through line 15 is reintroduced into the solvent stripper column through reboiler 12. A portion of the aromatic product is recycled to the solvent stripper through line 23 as reflux to knock-back the sulfolane in the overhead stream of the stripper. The lean solvent containing trace amounts of water is passed out of solvent stripper 11 through line 3 and is reintroduced into extractive absorber-stripper column 1 at the uppermost tray of the column after passing through heat exchanger 16 and cooler 17. The lean solvent can contain up to 10% v. water, with the exact concentration desired being maintained by controlling stripper column conditions. Valved line 18 is provided for the addition of fresh solvent to the system as required. A slip stream of lean solvent of approximately 5 to 10% of the total solvent inventory can be taken by line 19 to a solvent clean-up flasher or vacuum column during each 24-hour period to remove contaminants. After solvent clean-up the solvent can then be returned to the system through line 3 (not shown).

We claim as our invention:

1. An absorption, stripping, extraction process for recovering aromatic hydrocarbons from a hydrocarbon mixture containing aromatic and non-aromatic hydrocarbons of which the aromatic content is at least 75% by weight of said mixture which comprises introducing a sulfolane solvent into an extractive absorber stripping zone near the top of the zone, introducing the highly aromatic feed mixture into the zone at a point below the introduction of the sulfolane solvent, countercurrently contacting the vapor of said mixture with the liquid sulfolane solvent to selectively absorb the aromatic components of the vapor at high purity, withdrawing overhead from said zone, a vapor-phase raffinate containing non-aromatic hydrocarbons, sulfolane solvent and some aromatic hydrocarbons, condensing said raffinate and extracting the raffinate in a raffinate extraction zone with a lean sulfolane solvent to produce a fat sulfolane solvent and a pure non-aromatic hydrocarbon raffinate and introducing the fat sulfolane solvent from the raffinate extraction zone into a solvent stripping zone, withdrawing from the bottom of the extractive absorber stripper zone, the fat sulfolane solvent containing the selectively absorbed aromatics, introducing the fat sulfolane solvent into the solvent stripping zone along with the fat solvent from the raffinate extraction zone, stripping the extract therefrom and returning the lean solvent to the extractive absorber-stripper zone at a point above the feed entry and to the raffinate extraction zone.

2. A process in accordance with claim 1 wherein the selective solvent is a sulfolane type solvent having the structural formula

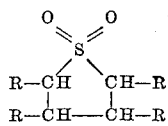

wherein R is selected from the group consisting of a hydrogen atom, an alkyl group having up to 10 carbon atoms, an alkoxy radical having up to 8 carbon atoms, an arylalkyl radical having up to 12 carbon atoms and mixtures thereof.

3. A process in accordance with claim 2 wherein the sulfolane solvent contains up to 10% v. water.

4. A process in accordance with claim 3 wherein the sulfolane solvent is sulfolane.

References Cited in the file of this patent

UNITED STATES PATENTS

| | | |
|---|---|---|
| 2,109,157 | Tijmstra | Feb. 22, 1938 |
| 2,350,256 | Shiras et al. | May 30, 1944 |
| 2,360,861 | Pierotti et al. | Oct. 24, 1944 |
| 2,377,049 | Souders | May 29, 1945 |
| 2,773,006 | Carver et al. | Dec. 4, 1956 |
| 2,904,508 | Hughes et al. | Sept. 15, 1959 |

OTHER REFERENCES

Sulfolane Extraction—Shell Development Company, Petroleum Refiner 38, No. 9, 185 (1959).